(No Model.)
R. W. HARE & R. SPROUL.
SHAFT ATTACHMENT FOR VEHICLES.
No. 379,462. Patented Mar. 13, 1888.
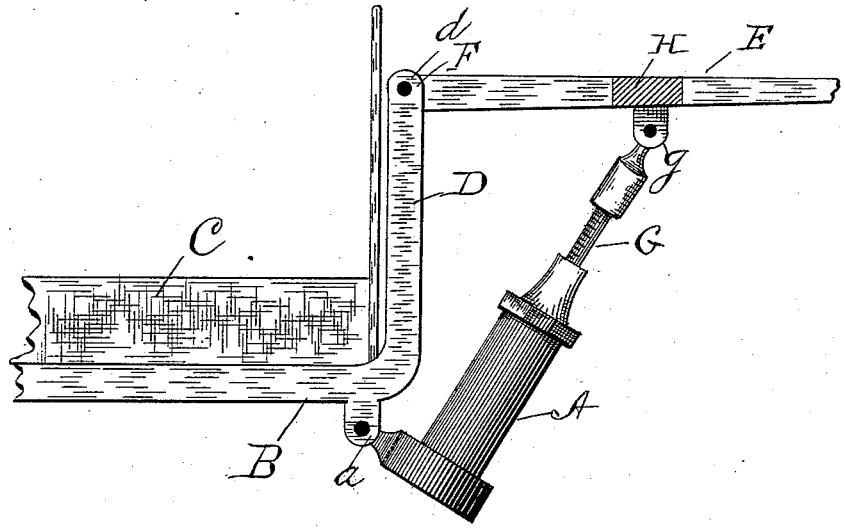
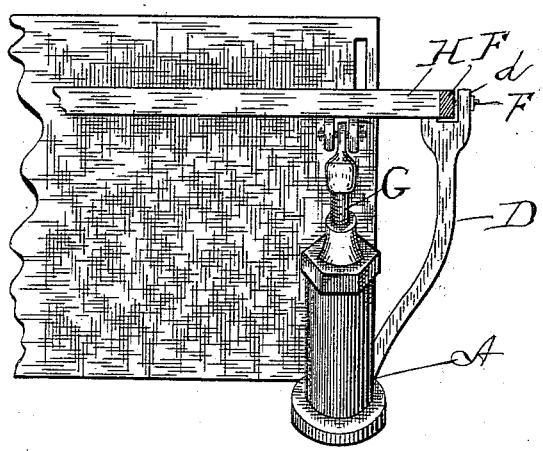

UNITED STATES PATENT OFFICE.

ROBERT W. HARE AND ROBERT SPROUL, OF PITTSBURG, PENNSYLVANIA, ASSIGNORS TO THE SPROUL VEHICLE MANUFACTURING COMPANY, (LIMITED,) OF SAME PLACE.

SHAFT ATTACHMENT FOR VEHICLES.

SPECIFICATION forming part of Letters Patent No. 379,462, dated March 13, 1888.

Application filed December 20, 1887. Serial No. 258,521. (No model.)

*To all whom it may concern:*

Be it known that we, ROBERT W. HARE and ROBERT SPROUL, citizens of the United States, residing at Pittsburg, in the county of Allegheny and State of Pennsylvania, have invented certain new and useful Improvements in Shaft Attachments for Vehicles; and we do hereby declare the following to be a full, clear, and exact description of the invention, reference being had to the accompanying drawings, which form part of this specification.

This invention has relation to shaft-attachments for vehicles, and relates particularly to that class of shaft attachments shown and described in Letters Patent of the United States No. 363,230, granted to us May 17, 1887.

Our present invention has for its object the provision of means whereby a shaft attachment of the kind described and claimed in the aforesaid Letters Patent may be employed in connection with a vehicle having shafts set wider apart at their rear ends than the width of the body of the vehicle.

Our invention consists in the combination, with the body of the vehicle, of a pivoted spring-brace extending upwardly from the lower corners of the front of the vehicle-body and having sockets and eyes at the top, by means of which the shafts are pivoted with a proper pivotal bearing outside of the front of the vehicle.

Our invention further consists in the novel construction, combination, and arrangement of parts hereinafter described and claimed.

Referring to the accompanying drawings, Figure 1 is a vertical sectional view of a part of a vehicle and its shafts, showing our invention applied thereto; and Fig. 2, a rear elevation of the shafts and our improved devices.

A A designate cylindrical cases or sockets containing spiral springs and pivotally secured at $a$ to irons B, which latter are firmly bolted to the bottom C of the vehicle. The iron braces B are formed with upwardly-extending arms D D, which curve outwardly to such a degree that their upper ends will be the same distance apart as are the rear ends of the shafts which are to be applied to the vehicle. The upper ends of the arms D D are provided each with two eye-lugs, $dd$, and between the lugs rest the ends of the shafts E E. Bolts F F, passing through the eye lugs $d$ $d$ and the ends of the shafts, serve to pivotally secure the shafts to the arms.

G G designate rods which slide in the cylindrical cases A A and are pivotally secured at $g$ $g$ to the cross-bar H of shafts E E.

The above-described device serves as a means whereby our patented spring shaft attachment may be applied to vehicles which have dash-boards—such as gigs, buggies, carts, and other light vehicles of that type—in which the shafts are ordinarily or preferably wider apart at their rear ends than the width of the vehicle.

Having described our invention, we claim—

In a shaft attachment for vehicles, the combination, with the iron B, having upwardly and outwardly extending arms D D, of the shafts E E, pivoted to said arms, and the spring-braces A G, pivoted to the iron B, and the cross-bar H, all substantially as described.

In testimony that we claim the foregoing we have hereunto set our hands.

ROBERT W. HARE.
    ROBERT SPROUL.

Witnesses:
 H. C. EVERT,
 LOUIS MOESER.